June 25, 1957 — H. J. BERNARD ET AL — 2,797,107
TRAILER AND TOW-CAR HITCH
Filed Dec. 17, 1954 — 2 Sheets-Sheet 1
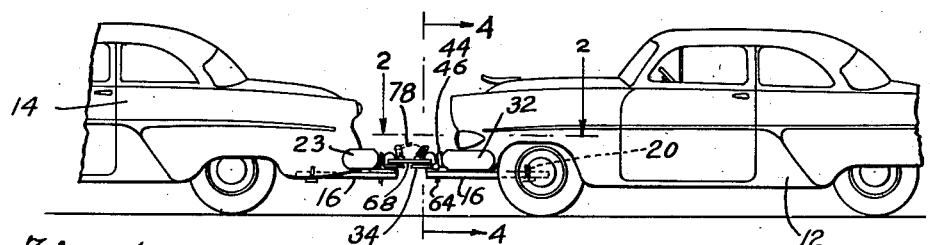
Fig.1.
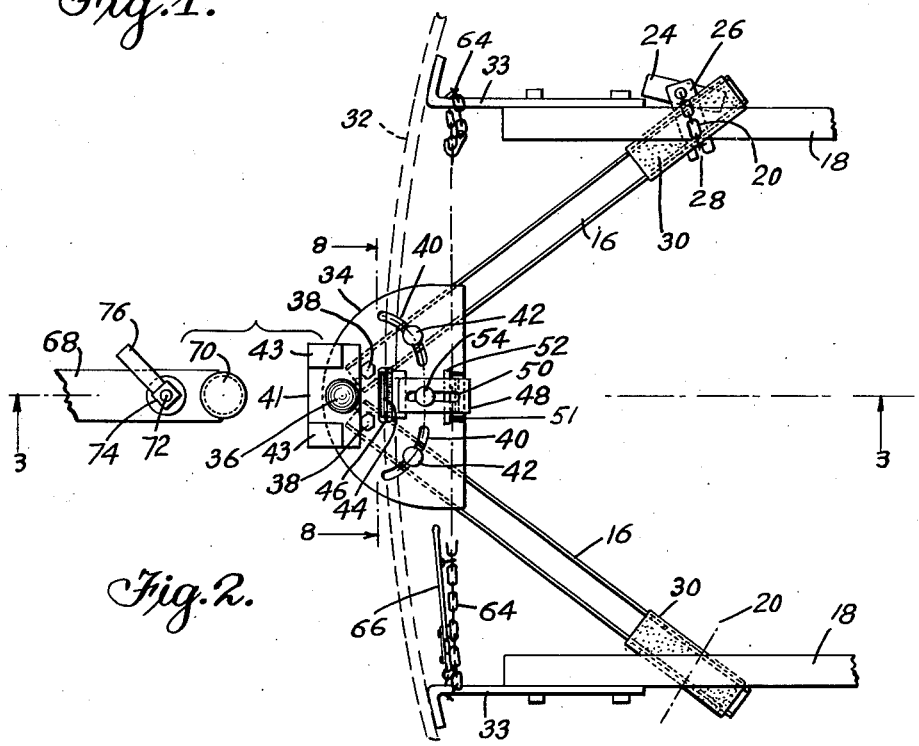
Fig.2.
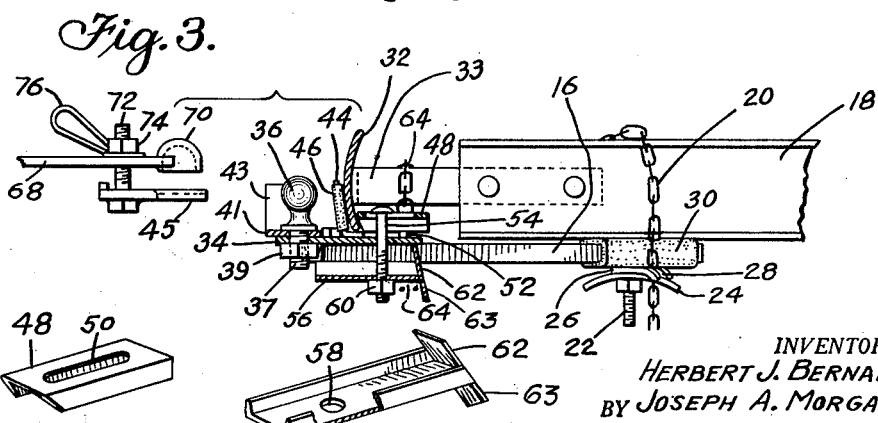
Fig.3.
Fig.10.
Fig.11.
INVENTORS
HERBERT J. BERNARD
BY JOSEPH A. MORGAN
ATTORNEY

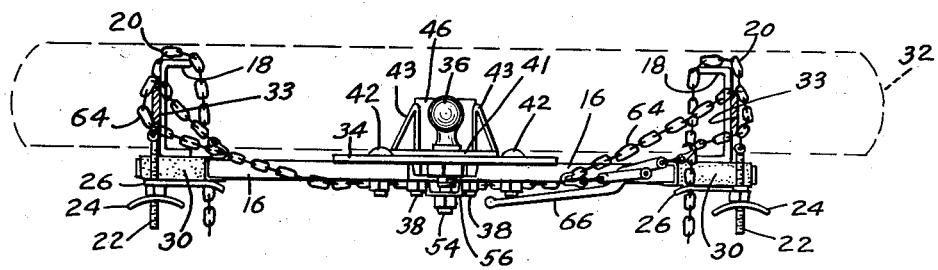
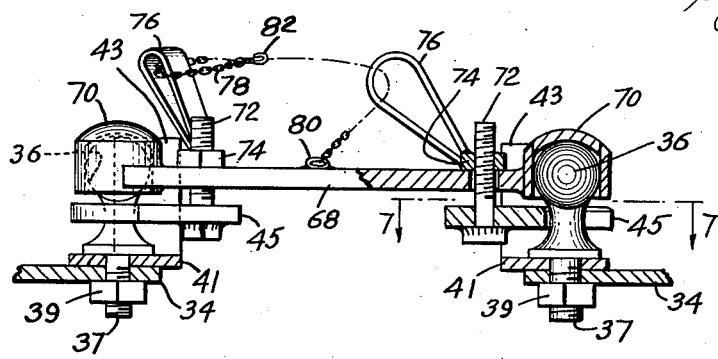
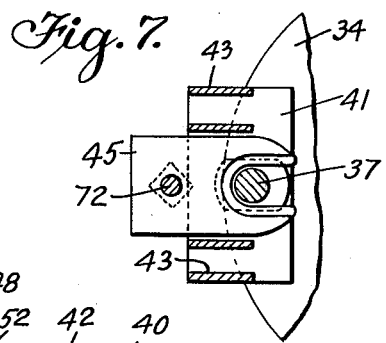
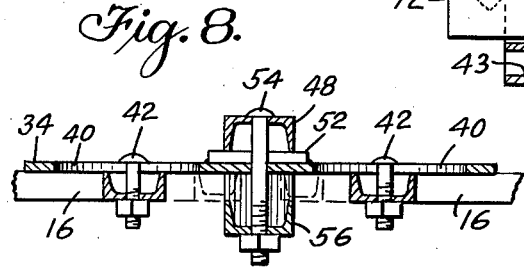
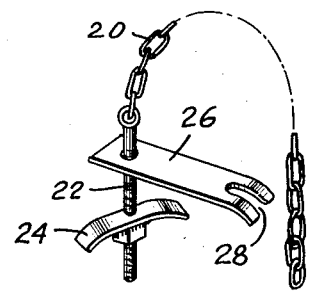
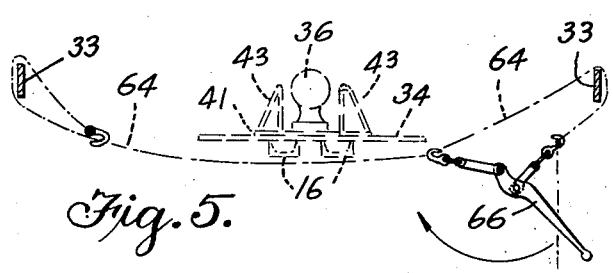

United States Patent Office 2,797,107
Patented June 25, 1957

2,797,107

TRAILER AND TOW-CAR HITCH

Herbert J. Bernard and Joseph A. Morgan,
Sun Valley, Calif.

Application December 17, 1954, Serial No. 476,008

7 Claims. (Cl. 280—501)

This invention relates to an improved trailer and tow-car hitch, and has for one of its principal objects the provision of means whereby a trailer, automobile or other vehicle can be readily and conveniently connected to another vehicle for the purpose of transporting the same from place to place.

One of the important objects of this invention is to provide a trailer hitch and towing apparatus which is so constructed that it can be readily and easily attached to an automobile, trailer or the like without the use of bolts which necessitate drilling or welding, which is expensive and troublesome.

Another object of the invention resides in the provision of a simple yet efficient device which can be alternatively applied to the rear of an automobile, truck or other vehicle to adapt it for use as a tow-car, or to the front end of a trailer, automobile or other vehicle, whereby the same can be conveniently towed.

Yet another object of the invention is to provide a practical, interchangeable unit for vehicle towing purposes which will fit almost any car or similar vehicle, which is relatively light in weight yet sufficiently sturdy to meet all demands, and which, when once properly fitted into position, will meet the most extreme demands of arduous service.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of two automobiles with the improved hitch and towing device of this invention connecting the same for towing purposes.

Figure 2 is an exploded top plan view of the main elements comprising the structure of this invention. This enlarged view is taken on the line 2—2 of Figure 1, looking downwardly.

Figure 3 is likewise an exploded view showing in more detail the related parts of the trailer hitch construction of the invention and this view is taken on the line 3—3 of Figure 2, looking in the direction indicated by the arrows.

Figure 4 is a front view of the trailer hitch and towing device of this invention showing the same in position on the front end of a car which is to be towed, and this showing has been taken along the line 4—4 of Figure 1, looking rearwardly.

Figure 5 is a schematic and diagrammatic view of the chain means for forcing all of the related parts of the invention into an operative and safe structure.

Figure 6 is an enlarged vertical section showing a slight modification wherein a single tow-bar, constructed in accordance with the principles of this invention, is used to connect the rear end of one automobile to the front end of another, for towing purposes.

Figure 7 is a partial sectional detail taken on the line 7—7 of Figure 6, looking in the direction indicated.

Figure 8 is a vertical section taken on the line 8—8 of Figure 2.

Figure 9 is a perspective view showing in more detail the means employed for fastening one of the arms of the tow- or towing bar of this invention to the under-frame or chassis of an automobile or the like.

Figure 10 is a perspective view of one of the elements comprising an important detail of the invention.

Figure 11 is a similar perspective of another and co-operating element.

As shown in the drawings:

The reference numeral 12 indicates generally an automobile or other vehicle to which the trailer and tow-car hitch of this invention is applied. A similar vehicle is shown at 14 and in towing position with relation to the car 12.

The apparatus itself comprises a pair of channels 16 formed of suitable material of desired dimensions which are fastened at their divergent ends to respective portions of the chassis or frame 18 of an automobile or other vehicle, all as best shown in Figure 2. One of the fastening means is illustrated in Figures 2, 3 and 9, and includes a chain 20 which is looped over the chassis portion 18. One end of the chain is fixed to an eye-bolt 22 having a winged nut or similar element 24 screw-threaded thereon and the eye-bolt passes through an opening in a clamping bar 26 having a downturned end provided with a slot 28. After the clamping bar has been placed under the channel or other element 16 and the chain 20 has been passed over the chassis beam 18, one of the links at the free end of the chain is inserted into the slot 28 and the winged nut 24 turned about the eye-bolt 22 until such time as the parts are securely fastened together. A cushioning sleeve of rubber or the like 30 is usually applied to the bar or channel 16 to provide a better gripping action to prevent rattles and also to eliminate marring of the parts.

The forward ends of the channels or bars 16 are then brought together into close proximity, as illustrated in Figure 2, beneath the bumper 32 of the vehicle 12, and a semi-circular metal plate 34 is fitted into position beneath the bumper and over the juxtaposed ends of the elements 16.

This plate 34 has a single opening adjacent the middle of its leading edge into which a ball element 36 is fitted, as is usual in such trailer hitch constructions. The ball element has a screw-threaded shank 37 for the reception of a fastening nut 39 and a guard member comprising a plate 41 with inverted V-shaped extensions 43 thereon (Figure 7) and with an opening in the portion 41 for the reception of the shank 37, is preliminarily placed on the plate 34, this being for the purpose of more securely retaining the slotted open end of a tow bar element 45.

Just behind the opening for the ball element 36 is a pair of openings in the plate 34 adapted to receive bolts 38 (Figure 2). These bolts pass through corresponding openings in the ends of the channels or bars 16. Arcuate slots 40 are formed in the plate 34 which centers on the bolts 38 and additional bolts 42 are fitted into the slots passing through corresponding openings in the channels 16. In this manner, the plate 34 can be securely fastened in adjusted position to the angularly disposed channels 16.

An upward extension 44 (Figure 3) is welded or otherwise fitted on to the plate 34 centrally thereof and behind the openings which receive the bolts 36 and 38, and this is surrounded with a rubber or other protective sleeve 46 for close but non-marring contact with the front face of the adjacent portion of the bumper 32. A channel shaped element 48 having a slot 50 therein, as best shown in Figure 10, is then applied to the upper face of the plate 34 and against the rear face of the bumper 32, all as best shown in Figure 3. In order to keep the element 48 on a desired level, a protuberance 52 is welded or otherwise affixed to the upper face of the plate 34 and a bolt 54 is then passed through the slot 50 and through a further opening in the plate 34. A channel-shaped clamping element 56 (Figure 11) is then fitted into position under the plate 34 and the lower end of the bolt 54 is passed through an opening 58 in this element with a fastening nut 60 at its end. The channelled element 56 has a rearward angularly inclined upwardly extending lip or ledge 62, the upper edge of which contacts the underface of the plate 34 and the forward edges of the channel element 56 fit under the juxtaposed ends of the channels 16. Tightening of the nut 60 on the bolt 54 firmly fastens all these related parts into desired operative position.

For a further assurance of structural co-operation and safety, a chain 64 is passed around the two supports 33 of the bumper 32 (Figures 2 and 4) and beneath the assembled construction just described, and this chain is then tightened into position by cinching the same with a tightening element 66 of well-known construction.

In the event that the apparatus is to be applied to the car 14 for towing purposes, the same procedure is followed with the exception that it is applied to the rear of the car and associated with the rear bumper 23.

The towing connection comprises essentially a strip or link 68 of suitable strength and dimension, having sockets 70 at its ends which fit over the balls 36. Bolts 72 pass through openings adjacent the ends of the bar 68 and these bolts support plates 45, the open ends of which fit around the shanks 37 of the balls 36 (Figure 6).

Nuts 74 are applied to the upper threaded ends of the bolts 72 and these nuts are provided with integral loops 76 through which a chain 78 is passed to prevent their turning and coming loose due to vibration. One end of the chain is fastened to an eye 80 welded to the bar 68 and the other end of the chain has a snap fastener 82 for convenient positioning.

Ledges in the form of guides for the proper positioning of the channelled element 48 are provided on the plate 34 as indicated at 51, and a downward extension 63 is provided on the element 56 for better positioning and a more secure holding relationship of the chain 64.

This chain can be fastened to the bumper brackets 33 by S-hooks rather than by being looped around the same, and the chain tightening element 66 can be employed to pull more closely together selected adjacent links of the chain rather than by a connection with one end and a selected link. This prevents any undesirable slippage of the chain around one of the bumper brackets which might otherwise happen.

It will be evident that herein is provided a combination trailer and tow-car hitch which can be conveniently and satisfactorily used for such purposes and which possesses the added advantage of quick installation, ready removal and inter-changeability so far as towing and towed relationship is concerned.

We are aware that many changes may be made and numerous details of construction varied throughout a wide range without departing from the principles of this invention, and we therefore do not propose limiting the patent granted hereon otherwise than as necessitated by the prior art.

We claim as our invention:

1. A trailer and tow-car hitch comprising a pair of similar bars, means for removably fastening one end of each bar to the chassis of an automobile having a bumper, means for adjustably fixing the other ends of said bars so as to permit relative angular adjustment of the bars, said means comprising a slotted plate, means on the plate for abutting the bumper of the automobile, a hitch ball attached to the plate, means for fastening the plate, the angularly disposed bars and the ball in desired position, said fastening means including a pair of channelled elements, and a bumper and hitch wraparound chain, one of said channelled elements having a bolt receiving slot and adapted to contact the rear face of the bumper and the top face of said plate, the other of said channelled elements fitting beneath the plate and the bars, and a fastening bolt passing through both of said channelled elements and an opening in the plate.

2. A device as described in claim 1, wherein a guard member is fitted around the trailer hitch ball at the leading edge of the plate.

3. A device as described in claim 2, wherein said guard element comprises a base portion having an opening therein through which the ball shank is fitted and two laterally disposed V-shaped side elements on the base portion.

4. A device as described in claim 1, wherein the fastening means for connecting the ends of the bars to the car chassis include a length of chain, a slotted clamp bar, an eye-bolt passing through an opening in the bar and a winged nut on the eye-bolt, said eye-bolt connected to one end of the chain.

5. A device as described in claim 1, wherein a connecting means is provided for the hitch, said connecting means including a bar, a ball receiving socket at one end of the bar, a bifurcated plate beneath the socket and a bolt connecting the plate to the bar, the bifurcations of said plate encompassing the hitch ball shank.

6. A device as described in claim 1, wherein a tightening means is provided for the hitch wrap-around chain.

7. A device as described in claim 6, wherein chain positioning means are included in the plate fastening means.

References Cited in the file of this patent

UNITED STATES PATENTS

| | | |
|---|---|---|
| 1,053,054 | Miller | Feb. 11, 1913 |
| 2,045,793 | Pearson et al. | June 30, 1936 |
| 2,097,006 | Weis | Oct. 26, 1937 |
| 2,104,576 | Zagelmeyer | Jan. 4, 1938 |
| 2,196,115 | Jacobson | Apr. 2, 1940 |
| 2,562,824 | Schmidt | July 31, 1951 |
| 2,616,717 | Dunlap | Nov. 4, 1952 |

FOREIGN PATENTS

| | | |
|---|---|---|
| 934,347 | France | May 19, 1948 |